United States Patent [19]

Mathis et al.

[11] Patent Number: 4,814,579
[45] Date of Patent: Mar. 21, 1989

[54] ELECTRIC RESISTANCE AIR REATING SYSTEM FOR AN AIRCRAFT CABIN

[75] Inventors: Lee R. Mathis, Dana Point; George W. Panagotacos, Corona; Steve K. Panagotacos, Yorba Linda; Ronald A. Bruce, Corona, all of Calif.

[73] Assignee: Innovative Scientific Development, Inc., Newport Beach, Calif.

[21] Appl. No.: 849,149

[22] Filed: Apr. 7, 1986

[51] Int. Cl.⁴ .................. B64D 13/00; H05B 1/02; F24H 3/04; B60H 1/00
[52] U.S. Cl. .................... 219/202; 219/279; 219/364; 219/370; 219/376; 237/12.3 C; 244/118.5
[58] Field of Search ............. 219/202, 374-376, 219/378, 279, 364-371, 381, 382; 237/12.3 C, 12.3 A; 244/118.5

[56] References Cited

U.S. PATENT DOCUMENTS

| | | | |
|---|---|---|---|
| 427,574 | 5/1890 | Howard | 219/374 |
| 1,190,780 | 7/1916 | McElroy | 219/364 |
| 1,217,229 | 2/1917 | Smith | 219/364 |
| 1,232,598 | 7/1917 | Norstrom et al. | 219/364 |
| 2,158,733 | 5/1939 | Sola | 219/202 X |
| 2,321,579 | 6/1943 | Colby | 219/202 X |
| 2,353,112 | 7/1944 | La Sha et al. | 237/12.3 C |
| 2,980,785 | 4/1961 | Whitney | 219/364 |
| 3,067,316 | 12/1962 | Hill | 219/369 X |
| 3,116,394 | 12/1963 | Barton | 219/376 X |
| 3,313,915 | 4/1967 | Chamberlain, Jr. . | |
| 3,324,675 | 6/1967 | Mills | 244/118.5 X |
| 3,576,970 | 5/1971 | Cherry . | |
| 3,585,358 | 6/1971 | Nilssen . | |
| 3,668,419 | 6/1972 | Cherry et al. . | |
| 3,800,121 | 3/1974 | Dean et al. . | |
| 3,855,450 | 12/1974 | O'Connor . | |
| 3,971,511 | 7/1976 | Casey . | |
| 4,156,836 | 5/1979 | Wiley . | |
| 4,167,695 | 9/1979 | Phillips . | |
| 4,357,524 | 12/1983 | Apfelbeck et al. . | |
| 4,419,926 | 12/1983 | Cronin et al. . | |
| 4,434,624 | 3/1984 | Cronin et al . | |
| 4,523,517 | 6/1985 | Cronin . | |

FOREIGN PATENT DOCUMENTS

323320 12/1972 U.S.S.R. .................. 219/365

*Primary Examiner*—Anthony Bartis
*Attorney, Agent, or Firm*—Knobbe, Martens Olson & Bear

[57] ABSTRACT

An aircraft cabin air heater system for a multiengine aircraft having a cabin and a nose duct communicating therewith includes an electric resistance air heater unit positioned in the cabin and provided with air ducts leading from the cabin to the air heater unit and back to the cabin. A fan associated with the air ducts and heater unit recirculates air from the cabin through the air ducts and heater for heating the air. The air ducts are connected to the nose duct and are arranged to permit sufficient outside air to enter the cabin through the nose duct to maintain the oxygen level sufficient for passenger comfort while limiting the amount of outside air to that which will permit the air heater unit to maintain the cabin temperature at a comfortable level. An alternator driven by one of the engines provides electrical power to the air heater unit and serves as an auxiliary back-up electrical power for the aircraft in case the aircraft's main electrical power supply fails. The air heater unit includes first and second selectively energized heater coils so as to provide high and low heat output levels. The electric air heater may replace the combustion air heater unit conventionally used to heat cabin in such aircraft.

5 Claims, 4 Drawing Sheets

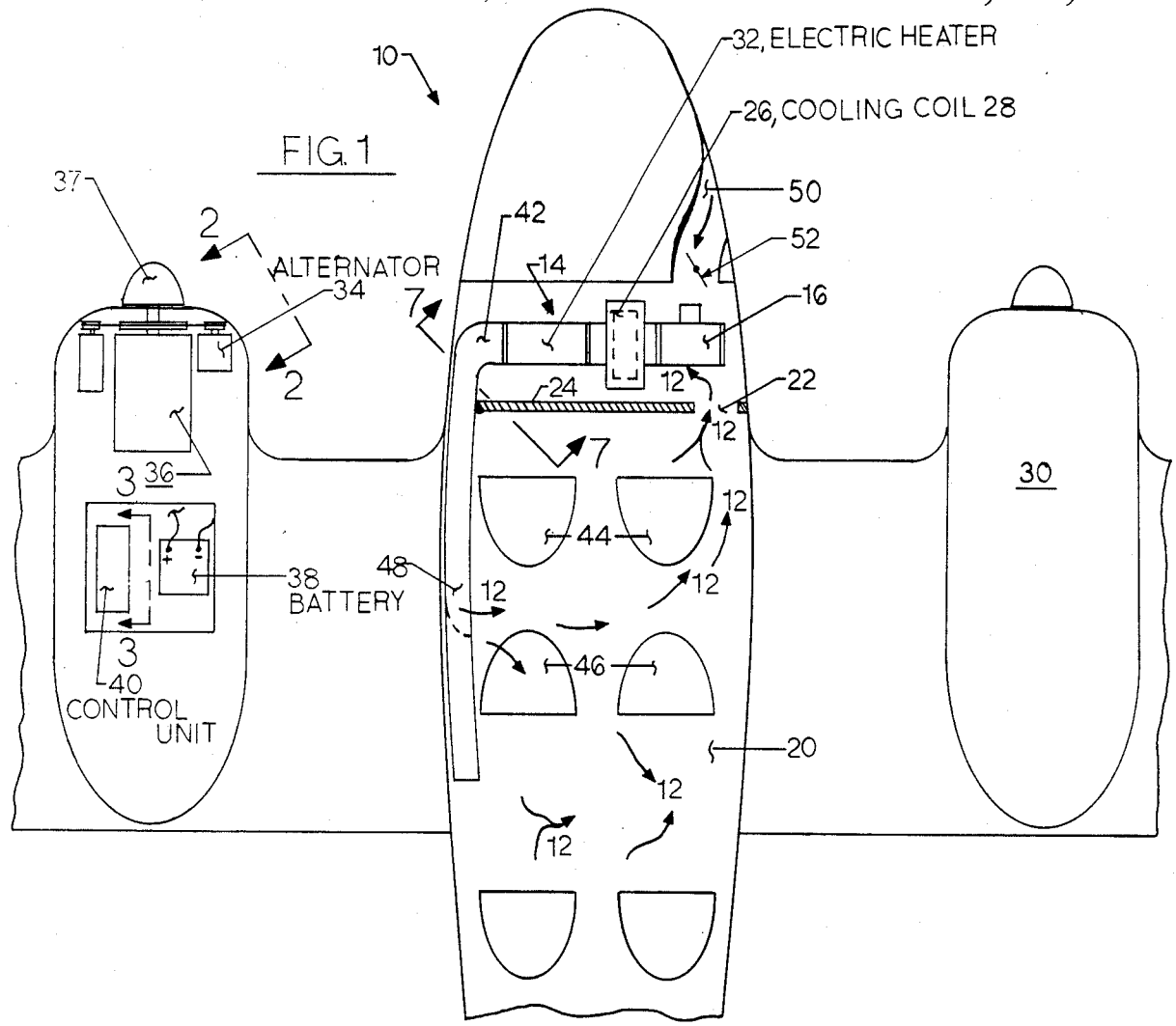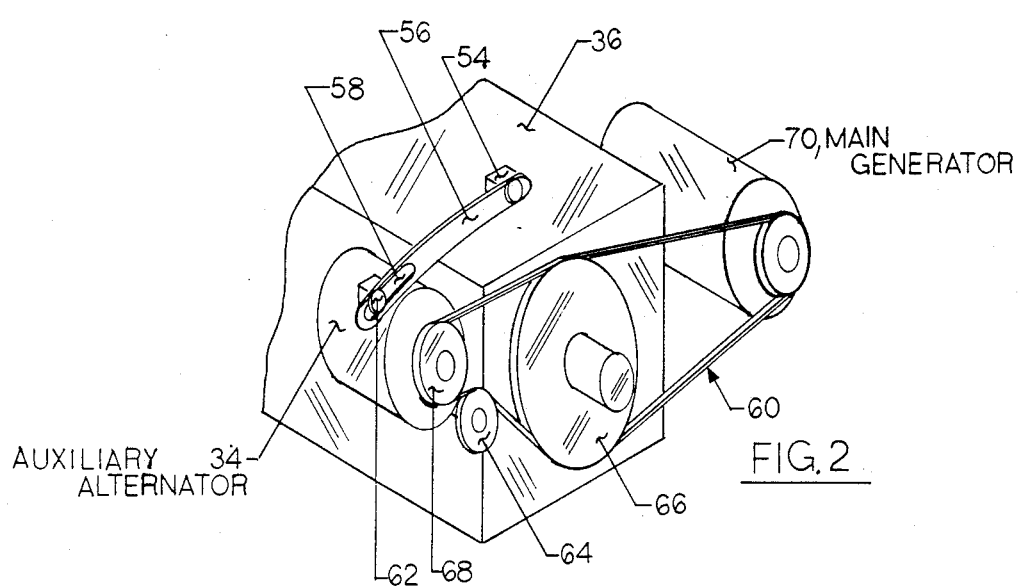

ELECTRIC RESISTANCE AIR REATING SYSTEM FOR AN AIRCRAFT CABIN

BACKGROUND OF THE INVENTION

This invention relates to the field of aircraft cabin environmental control systems and in particular to the use of an electrical resistance heater to provide heat for an aircraft cabin.

An environmental control system for the passenger cabin of an aircraft usually acts to maintain the ambient air in the cabin at both a comfortable temperature and pressure. Some smaller planes, which are not designed to reach very high altitudes, do not have any provision for pressurization of the cabin. However, nearly all planes include some provision for both warming up and cooling down the temperature of the air within the cabin.

Jet aircraft and turbo-prop aircraft usually obtain heated air for cabin temperature purposes as a by-product of the compression of the air used to drive the jet or turbo-prop engines. The compression itself acts to heat the air. This heated air is usually provided for use in adjusting cabin temperature by using appropriate ducting. Thus the big commercial airline jets and turbo-prop planes usually do not use a separate heat source to maintain a comfortable cabin temperature.

Single engine propeller airplanes usually take the heat needed to maintain a comfortable cabin temperature directly from a heat exchanger located around the manifold of the engine. This is because the engines on these planes ar usually mounted at the nose of the plane directly in front of the passenger cabin. Thus where heat is required because the outside air temperature (OAT) is too cold, the heat is provided by passing outside cold air directly over the manifold of the engine and then into the cabin. The ducting for the heat transfer from the exhaust manifold of the engine to the cabin is fairly straight forward in these single engine planes.

In the case of a twin engine propeller, fixed wing aircraft the problem of how to provide heat to the interior of the cabin has been approached in two ways. One approach is to use the heat directly from one or both of the engines to heat the outside air. Because these engines are mounted on the wings it is necessary to provide ducts which extend through the wings to the cabin. Although the cabins of some twin engine planes are heated in this way, most are not. The reason for this may be that because of the small size of the planes it is very difficult, from a design point of view, to provide the necessary ducting through the wings of the plane. Additionally, because of the proximity of the ducting to the exhaust of the engines it is necessary to inspect the ducts for cracks on a regular basis to be sure that carbon monoxide is not being drawn into the cabin. The longer and more convoluted the ducting is, the more difficult such an inspection becomes.

In any event, the fact is that very few twin engine, propeller planes use heat obtained from the engines to heat the cabin. Instead most of these planes provide a separate fuel combustion chamber and exhaust port located in the nose of the plane. These combustion heaters are an attempt to duplicate the heat source which would otherwise be available at the nose of the plane if an engine was mounted in the nose. The idea is that it is easier to create an "exhaust manifold" in the nose of the plane than it is to provide the ducting through the wings necessary to utilize the heat from the exhaust manifolds on the engines.

In the case of unpressurized twin engine planes, cold air from outside the plane is passed through a heat exchanger in close proximity to the combustion heater to provide heated air for the cabin. In such planes the heated air is discharged form the unsealed cabin fairly rapidly allowing freshly heated air to quickly take its place.

In pressurized planes the cabin is sealed and is pressurized by compressors, run by the plane's engines. These compressors compress outside air and inject it into the cabin through the wings at a pressure somewhat higher than the desired pressure for the cabin. The desired pressure is maintained by the provision of a pressure relief valve at the rear of the cabin which continuously vents air to the atmosphere. The amount of fresh air flow obtained through the compressors is usually fairly small compared with that which flows through the unpressurized planes. However, the fresh air provided to the cabin in this manner is sufficient for breathing purposes. In some pressurized planes the pilot has the option of providing heat in the cabin by mixing outside air with recirculated cabin air or simply recirculating the cabin air only through the combustion heater.

The most widely used combustion chamber airplane heater is the Janitrol combustion heater. The Janitrol heater is formed of two concentric cylinders. The inner concentric cylinder is sealed at both ends to form a combustion can. The combustion can has an opening for admitting fuel directly from the airplane's fuel tank, along with the air needed to burn the fuel. In addition, an opening is provided for exhaust fumes to be ejected. A spark plug is provided for igniting the fuel and air mixture. When it is desired to heat the interior of the cabin, fuel and air are injected into the combustion can and ignited by the spark plug. An exhaust fan is provided to blow the exhaust gases out of the exhaust port after combustion.

The consequent explosions inside the combustion chamber generates a great deal of heat on the outer surface of the inner cylindrical can, just as the explosions within the engine cylinders create a great deal of heat on the outside surfaces of exhaust manifolds of aircraft engines. The outer concentric cylinder is spaced from the inner concentric cylindrical can to permit air to flow therebetween. Air from the outside and, in the case of some pressurized planes, air from the cabin, is forced through this annular air space and then into the cabin. As the air passes by the extremely hot surface of the inner combustion chamber the air is warmed up. This warm air, in turn, warms up the cabin.

The Janitrol combustion heater is a very effective heater. However, the combustion heater has a number of problems. One of the most obvious problems is that a separate combustion chamber, apart form the combustion chambers provided by the plane's engines, is provided in the nose of the plane. Every time the heater is turned on, fuel from the aircraft's fuel tank is pumped into the combustion chamber and ignited.

Although the combustion chamber of the Janitrol heater is intended to withstand the resulting explosions a great deal of stress is crated. For this reason the F.A.A. considers the combustion heater to be a potentially serious hazard and requires that all combustion heaters be inspected on a yearly basis. The inspection is intended to determine whether or not there are any cracks or defects in the combustion container. Because there is no ready access to the combustion container this inspection procedure is very expensive. Further, if the Janitrol heater must be reconditioned the expense can run mush higher.

In view of the dangerous nature of the Janitrol heater a number of people in the business refer to the heater as a "flying bomb". Further, a number of accidents have been traced to Janitrol combustion heaters. Malfunction of a combustion heater has been known, for example, to cause flames to shoot out of the exhaust port of the heater and around the cockpit of the plane.

As a result of the dangerous nature of these combustion heaters as well as the expense of complying with F.A.A. regulations, many pilots have simply disconnected the heaters. Although a cabin heater is not always required, disconnecting the heater is certainly not a satisfactory solution.

SUMMARY OF THE INVENTION

The present invention solves the problems associated with the Janitrol combustion heater by providing an environmental control system for the cabin of an aircraft which utilizes an electrical resistance heater instead of a gas combustion heater. This has been made possible by the recognition that while the Janitrol combustion heater generates much more heat than could reasonably be supplied by an electrical resistance heater powered by the aircraft's engines, this heat is not, for the most part, being used efficiently. In fact, it turns out that by taking reasonable energy saving steps a reasonably sized electrical power generator can provide enough electrical energy to adequately heat the cabin of an aircraft using electrical resistance heating, without significantly affecting the aircraft's performance. In particular a cabin heating system constructed in accordance with the present invention acts to eliminate the fire hazard caused by the Janitrol combustion heater, lowers fuel consumption, significantly increases the reliability of the heating system and adds a source of back-up power for the aircraft's electrical system.

In one aspect of the invention, an environmental control system for an aircraft cabin has been provided which includes an electric resistance heater, a source of electrical power located on board the aircraft, and a system for circulating the air within the aircraft cabin through the electrical resistance heater.

In another aspect of the invention, the electrical power for the heater is generated by an alternator having a voltage and amperage output compatible with the electrical system of the aircraft and being wired into the electrical system of the aircraft such that it may be used as an auxiliary power supply should the main aircraft power supply fail. In another aspect of the invention, the electrical heater includes a plurality of resistive heating coils connected in parallel. In another aspect of the invention, two sets of heating coils and a switch are provided allowing for selection between only one set of heating coils or both sets of heating coils. In a further aspect of the invention the environmental control system is set up to limit the air entering the cabin from the outside to that reasonably necessary to keep the oxygen level at a satisfactory level for passenger comfort.

BRIEF DESCRIPTION OF THE DRAWINGS

FIG. 1 shows a a partial outline in dotted lines of a twin engine fixed wing airplane with schematic showing of a preferred embodiment of the present invention;

FIG. 2 is a view taken along line 2—2 of FIG. 1, showing how the alternator may be mounted on the block of the left-hand engine of the airplane

DETAILED DESCRIPTION OF A PREFERRED EMBODIMENT

Figure 3:
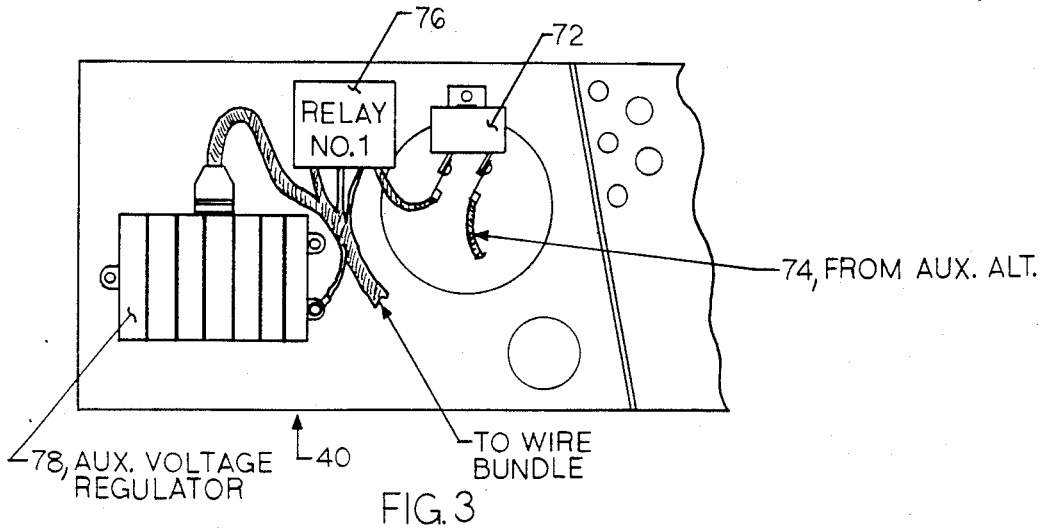
FIG. 3 is a view taken along line 3—3 of FIG. 1.

Referring now to FIGS. 1 through 10 a preferred embodiment of the present invention will be described. The preferred embodiment described herein is based on a twin engine, fixed wing airplane called a Beechcraft model 60 Duke. However, it will be apparent to one of ordinary skill in the art that the principles of the present invention can be applied to any aircraft including fixed wing airplanes as well as helicopters.

FIG. 1 shows a partial outline of a twin engine, fixed wing airplane 10 in dotted lines with the basic elements of a cabin environmental control system made in accordance with the present invention shown schematically in solid lines. One of the more significant features of the environmental control system disclosed here is that the cabin air is recirculated. The solid arrows 12 in the cabin show the direction of the airflow within the cabin and through the air conditioning and heating portions 14 of the system.

A squirrel cage fan 16 is provided on the right hand side of the fuselage 18 of the plane 10 to the draw air from the cabin 20 through an opening 22 in the bulkhead 24 and into the first stage of the cooling and heating system 14. The first stage is a cooling unit 26 which includes an evaporator coil 28. This cooling unit 26 is not shown in detail as it does not form part of the present invention and the functioning of cooling units of this type are well known. The cooling unit in the aircraft of FIG. 1 is driven by a right-hand aircraft engine 30. When the cabin temperature is too warm the cooling unit 26 may be turned on which in turn acts to cool the evaporator coils 28. As the warm air from the cabin passes over the coils 28, some of the heat in the air is lost to the coil and consequently the air being returned to the cabin is cooler.

The second stage of the cooling and heating system 14 is a cylindrical electrical resistance heater 32 having a plurality of electrical resistance coils. The power for this heater is generated by an alternator 34 run directly off the main pulley of the left-hand aircraft engine 36. The battery 38 needed to provide the initial current to get the alternator 34 started is shown in the rear of the left hand engine 36 along with some control circuitry 40 for the alternator 34. Thus when the cabin temperature is too cold the heater 32 may be turned on and electrical power supplied to the heater coils. This acts to heat the electrical resistance coils within the heater 32. As the cool air from the cabin 20 is directed over the heater coils, heat is added to the air and thus warmer air is returned to the cabin.

It can be seen that the return duct 42, 48 for the air acts to return the warmed cabin air to the mid-portion of the cabin between the front set 44 and middle set 46 of seats. By returning the heated air rapidly to the central portion of the cabin with a minimum of resistance the heat loss through the duct 42 and plenum 48 walls is reduced to a minimum.

Most twin engine propeller planes now being flown obtain the heat needed for their environmental control systems by using a combustion heater. By far the most popular combustion heater is the Janitrol combustion heater. This size and shape of the Janitrol heater used depends on the plane for which the Janitrol heater is intended to be used. The Janitrol heater designed for use in the Beechcraft 60 Duck twin engine plane is formed of two concentric cylinders. The center cylinder is closed at both ends to form a combustion can and has a connection to the fuel tank of the plane.

When it is desired to provide heat for the interior of the plane, a fuel and air mixture is introduced into the combustion chamber and ignited by a spark plug. The combustion continues until no more heat is required. The air is forced through the heater in the annular space between the outer cylinder and the inner concentric cylindrical combustion can. Because the combustion can is extremely hot, the air passing by is heated fairly rapidly.

Janitrol heaters designed to heat cabins having somewhere in the range of 120 to 220 cubic feet of cabin space usually provide upwards of 35,000 BTU's (British Thermal Units) per hour. The use of the combustion heater appears to be an attempt to provide a small heat generating source which duplicates, on a slightly smaller scale, the heat that would be generated by an aircraft engine and to locate that heat generating source conveniently in the nose of the plane. For unpressurized twin engine airplanes, when heat is desired in the cabin, outside air from just outside the nose of the plane is directed through the Janitrol combustion heater and then into the cabin of the plane. This air is then ejected fairly rapidly back outside the cabin because the cabin is not sealed.

Although this method of heating the airplane is convenient, it has been determined that this rapid change in cabin air is not required for breathing purposes. In particular it is acceptable under F.A.A. rules to completely close off the air coming through any nose ducts while flying in an unpressurized airplane. This is because sufficient air seeps into the unsealed cabin without the need for the rapid turnover of air provided by a nose duct. Thus it can be seen that a great deal of energy is unnecessarily lost when the nose duct is open to heat the cabin using the Janitrol heater. By recirculating the cabin air in these unpressurized planes instead of attempting to instantly heat the outside air, adequate heating of the cabin can be obtained using a heater which provides a much lower heat output than the Janitrol heater. In particular, it has been determined that a heater which generates about 7,000 's per hour is sufficient to adequately heat a cabin having up to 141 cubic feet of air space. Such a level of heating capacity can be made available by using a 1800 watt electric heater driven by a 28 volt 60 amp electrical power generator. Such a generator has a reasonable size and can be run directly off one of the engines of a twin engine plane taking only a maximum of approximately 3½ horse power to run.

In order to arrive at this conclusion a careful analysis was made using an actual twin engine airplane. In particular an aircraft blower fan (the squirrel cage fan 16 of the lane of FIG. 1) moving air at a rate of 211 cubic feet per minute (CFM) in its "high" position and 147 CFM in its "low" position was used with a plane having a cabin volume of approximately 141 cubic feet. Under these circumstances, assuming that no air is admitted from the outside, the entire of volume of air within the cabin would be recirculated through the fan, on its lower position, once every minute.

In calculating necessary BTU's per hour needed to provide an adequate rise in cabin temperature, total recirculation of all the air was assumed. However, the values for the thermal resistance of the wall of the aircraft as well as the surface area of the aircraft were selected very conservatively to account for the necessary introduction of outside air and the consequent loss of heated cabin air necessary to provide adequate fresh air for breathing purposes. Using the formula:

$$QR/A = \Delta T$$

where $Q$ = the number of watts $\times 3.42$ = (BTU/Hr); $R$ = thermal resistance factor (1/BTU/Hr/feet - degrees F.); $A$ = surface area of the interior of the cabin (feet squared) and $\Delta T$ = change in temperature. It was assumed that an 1800 watt heater would be used. Thus with:

$Q = 1800 \times 3.42 = 6,156$ BTU per hour
$R = 3$
$A = 169$ feet squared surface area Where R and A have been selected very conservatively, the maximum rise in cabin temperature from that of the outside air temperature (OAT) would be:

$$QR/A = \Delta T \text{ or } (6,156)(3)/169 = 110° \text{ F. rise.}$$

For a standard day with a sea level temperature of 59° Fahrenheit and an estimated loss of about 3.5° Fahrenheit for every 1,000 feet in altitude, at 24,000 feet the outside air temperature is likely to be about minus 25° Fahrenheit. Adding the 110° Fahrenheit differential calculated above, we come up with a conservative 85° Fahrenheit cabin temperature. Thus it was determined that adequate heating could be obtained using only 1800 watts of heating power.

As indicated previously in view of these calculations it was apparent that a 28 volt 60 amp alternator would provide sufficient power to run the necessary 1800 watt electrical heater for purposes of heating the cabin. The reference to the specific value of 1800 watts is made only to indicate that a reasonably low amount of power can be used to provide adequate resistance heating. A heater providing higher power output would still be feasible and is intended to be included within the scope of the invention. The low voltage was desirable in order to be compatible with the electrical system of a large number of aircraft now using combustion heaters.

Some twin engine aircraft, including the Beechcraft 60 Duke are pressurized aircraft. The air pressure for these pressurized cabins comes directly from compressors run by the aircraft's engines. The compressors compress the outside air and feed it into the cabin. In order to keep the cabin pressure at a desired level a valve in the rear of the cabin discharges cabin air out the rear of the plane when the pressure in the cabin exceeds the desired limit. The Duke comes with a recirculating cooling and heating system which has a provision for admitting air from outside the nose of the plane through a duct like the duct 50 shown in the FIG. 1 airplane. The duct may be opened or closed as desired using any suitable valve like the butterfly valve 52 shown in the FIG. 1 drawing. By testing the Duke with an 1800 watt electrical resisitance heater installed and the nose duct closed, it has been determined that adequate heating can be provided for the pressurized cabin by a reasonably sized electrical resistance heater. Thus, it appears that the amount of heat lost through opening of the pressure maintaining valve in the rear of the plane, does not significantly affect the calculations. Further, the turnover of air in the cabin caused solely by the compressors which act to pressurize the cabin provides sufficient fresh air for breathing purposes.

FIG. 2 is a detailed view of the front left engine 36 of the plane of FIG. 1 showing how the alternator 34 has been mounted on the engine 36. The alternator 34 may advantageously be a Motorcraft 28 volts DC (VDC), 60 amp aircraft alternator, P.N. DOFF10300-B. The alternator is mounted on the side of the engine block 36 at two points. The lower connection (not shown) is a pivot point and the upper connection 54 is to a curved bracket 56 which has a slot therein. When the proper tension on the drive belt 60 has been obtained, the alternator is secured to the upper bracket 56 with a bolt 62 extending through the slot 58 in the bracket 56. An idling pulley 64 pivoting around the same axis as the lower connection point for the alternator 34 is provided so that the drive belt 60 has a sufficient contact within the main driving pulley 66 to keep the alternator pulley 68 turning. The engine drive pulley 66 also drives the generator 70 for the aircraft's electrical system. The propeller cone 37 is shown in dotted outline in FIG. 2.

Turning back to FIG. 1, it can be seen that there is a control box 40 on the rear left-hand side of the left-hand engine 36 as well as a battery 38 on the right-hand side. Details of the control box 40 are shown in FIG. 3. In particular a 60 amp breaker 72 is provided for safety purposes in the power line 74 coming from the alternator 34. A power relay 76 is provided which permits the alternator 34 to be switched into the main power system of the aircraft as an auxiliary power generator in case of failure of the main power supply. FIG. 3 also shows the voltage regulator 78 for the alternator 34 which acts in a well known manner to regulate the voltage generated by alternator 34. The voltage is monitored by the regulator in a manner which will be described in more detail in connection with the circuit diagram shown in FIG. 9.

Figure 4:
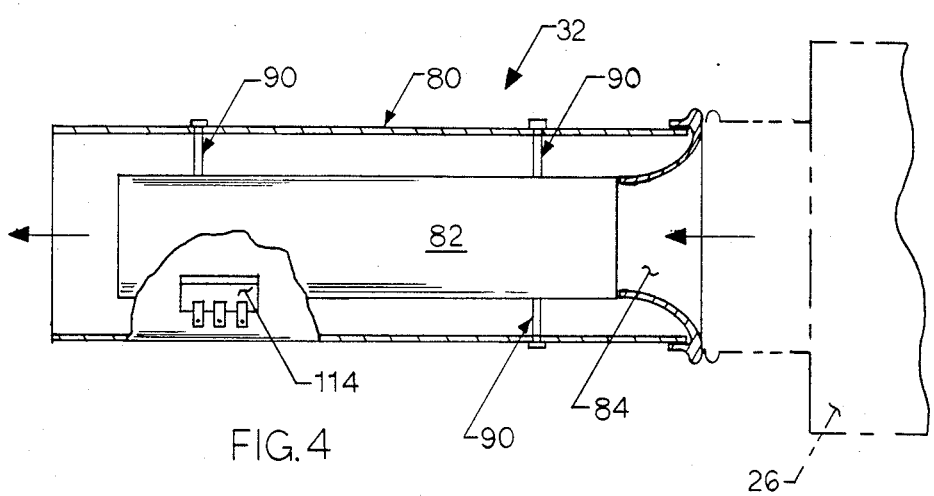
FIG. 4 is a partial, cross-sectional view of a cylindrical electrical resistance heater constructed in accordance with the present invention.

The heater unit 32 itself will now be described in connection with FIGS. 4, 5 and 10. The heater unit 32 is designed to replace the Janitrol heater and thus has a shape and construction quite similar to the Janitrol combustion heater. Like the Janitrol heater the present electrical resistance heater 32 has an outer cylinder 80 and a inner concentric cylinder 82. In the present electrical heater 32, however, a bell mouth 84 is provided at the entrance to the heater unit to direct the air flow into the inner cylinder 82. The inner cylinder 82 and outer cylinder 80 may be made of any well known suitable material, including, for example, sheet metal. In the case of pressurized aircraft like the Beechcraft 60 Duke the outer cylinder 80 is required to be a pressure cylinder. However, where no pressurization is required a pressurization cylinder of this type is not necessary.

Two separate ceramic support racks 86, 88 are mounted within the inner cylinder 82 and oriented parallelly to one another and parallel to the axis of the inner cylinder. The inner cylinder is advantageously spaced from the outer cylinder using spacer bolts 90. The inner support racks 86, 88 may be advantageously secured in place using suitable L-shaped brackets (not shown).

Figure 10:
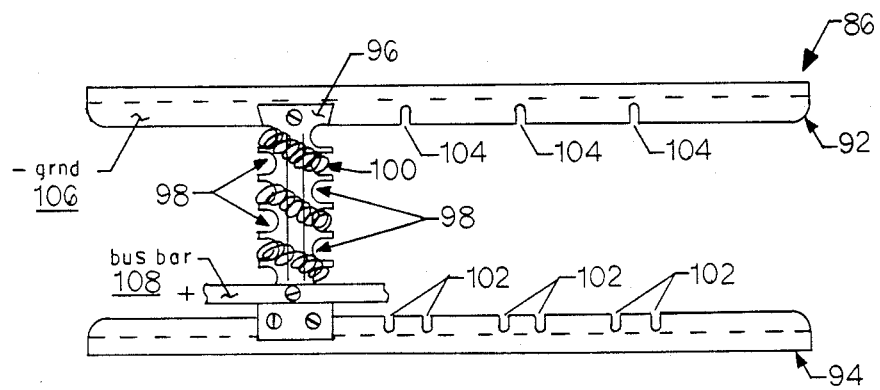
FIG. 10 is a top plan view of one of the ceramic support brackets for the heater coils of the electrical resistance heater shown in FIGS. 4 and 5.

One of the heater coil support racks is shown in FIG. 10. The rack includes two parallelly oriented ceramic rods 92, 94 connected by a ceramic coil holder 96. The coil holder has grooves 98 on both sides thereof for the acceptance and separation of heater coil 100 so that the heater coil may be wound around the holder 96. Although FIG. 10 shows only one ceramic coil holder 96, this preferred embodiment incudes four ceramic coil holders mounted in the grooves 102, 104 shown on the ceramic rods 92, 94. Each coil 100 is connected on one side to a ground strip 106 which is grounded through the cylindrical containers to a ground on the airplane. The other end of each coil is connected to a bus bar 108 which in turn is connected to the power input.

Figure 5:
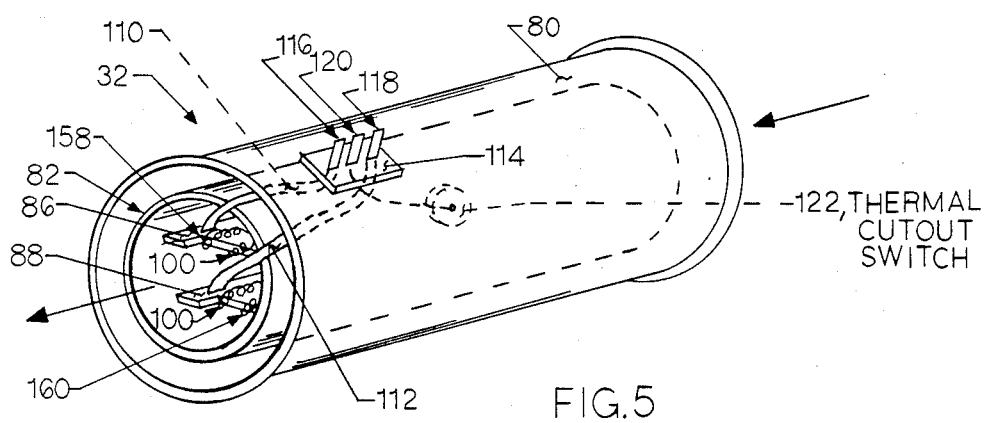
FIG. 5 is a perspective view of the cylindrical electrical resistance heater of FIG. 4.
Figure 6:
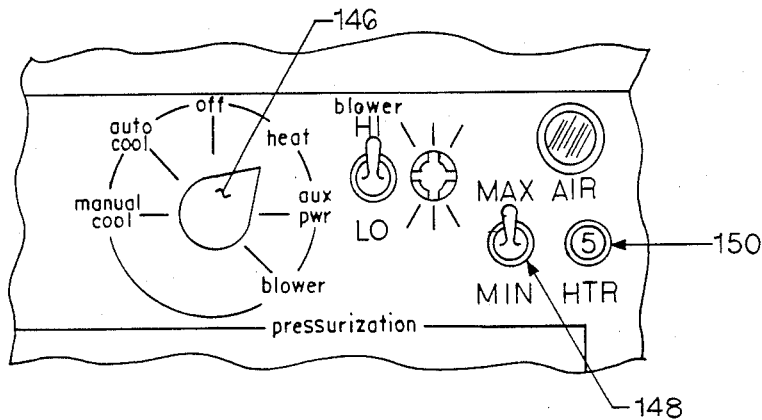
FIG. 6 is a view of a portion of the cockpit control panel of the airplane shown in FIG. 1 showing the controls for the heating and cooling system.

The conductor strips 110, 112 which connect the bus bars to the power connector 114 on the outside of the outer cylinder 80 are best seen in FIG. 5. The power connector 114 has three connectors 116, 118, 120, one for the upper series of four heater coils 116, one for the lower series of four heater elements 118 and the center connector for the temperature sensor and thermal cutout switch 122. Although plenty of current is available to run the heater, a low voltage was selected to be compatible with most aircraft electrical systems. For this reason it was determined that the heater coils should be wired in parallel to make the best use of the amperage available. The heater coils may advantageously be made out of Nichrome wire (55% nickel, 23% iron, 12% chromium) having a diameter of approximately 0.032 or 0.050 inches.

The center connector 120 runs to a temperature sensor 122 located on the outside surface of the inner cylinder. This sensor includes a cutout switch and is set up so that if the inner cylinder reaches a predetermined temperature, the power will be cut off to the heater coils 100. For longest coil life it is preferable that the coils not reach a temperature in excess of 1,000° to 1,100° Fahrenheit. Any temperature over this range results in significantly faster deterioration of the coils. With the inner cylinder having a four inch diameter it has been determined that the coils are in the range of 1,000° to 1,100° Fahrenheit when the inner cylinder is at about 200° Fahrenheit. Thus the cut-off temperature is advantageously set at 200° Fahrenheit.

Figure 7:
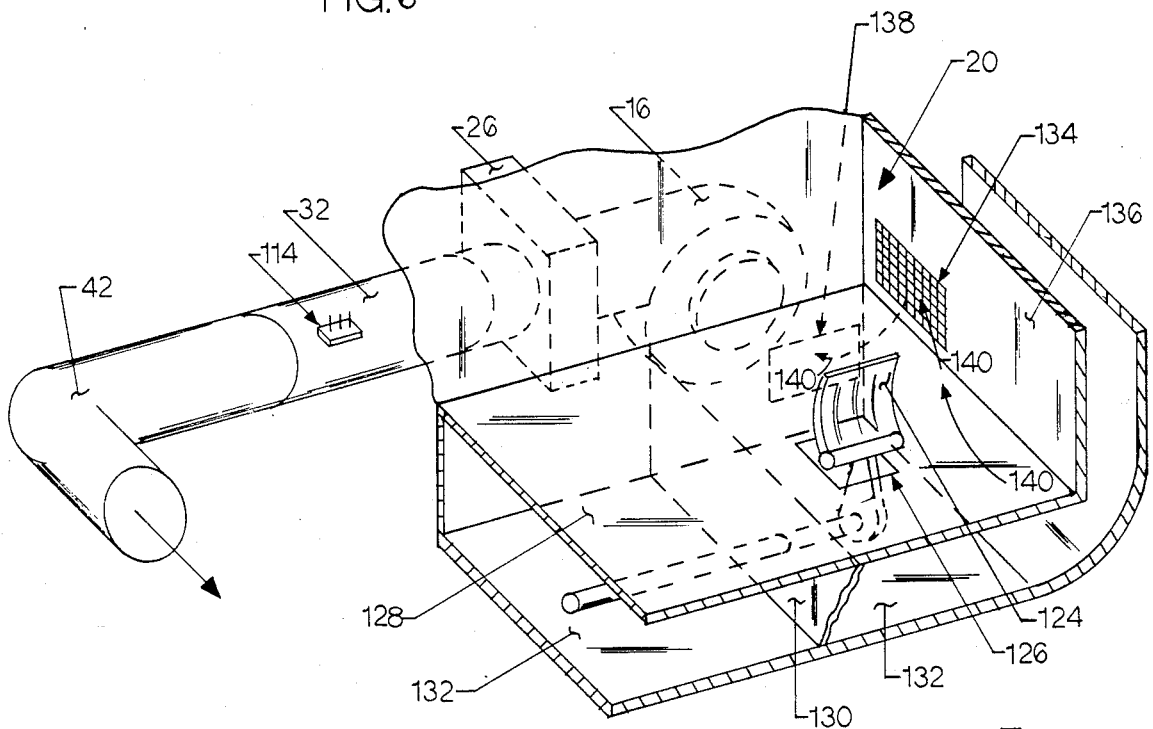
FIG. 7 is a perspective cut-away view of the subflooring of the airplane taken along line 7—7 of FIG. 1 showing how the air from the cabin is fed into the heater duct.

FIG. 7 shows a cut away of a portion of the right-hand side of the cabin of the plane of FIG. 1. The portion shown is located just under and in front of the co-pilot seat. A portion of the right-hand rudder pedal 124 is shown sticking up through a opening 126 in the sub-flooring 128 of the cabin of the plane. Below the sub-flooring is a wall 130 provided for support and the bottom wall 132 of the fuselage of the plane itself. In order to provide for circulation of air directly from the cabin through to the environment control system a screen 134 is provided on the right hand side wall 136 of the cabin. Because the side wall 136 is spaced from the outer wall 132 of the plane the air goes through the cabin wall 136 and down under the sub-flooring 128 to the opening 138 in the bulkhead wall which leads to the squirrel cage fan 16. Although it is not shown, the path along which the air flows, shown by the arrows 140, into the bulkhead wall opening is sealed and insulated so that most of the air drawn in by the fan 16 comes directly from the cabin and not from the cooler area under the sub-flooring 128.

As discussed previously the fan 16 forces air first through the cooling unit 26 and then through the cylindrical electrical heater 32 which is mounted in line with the fan 16 and the cooling unit 26. The electrical heater unit 32 has been described in detail in connection with FIGS. 4, 5 and 10.

Figure 8:
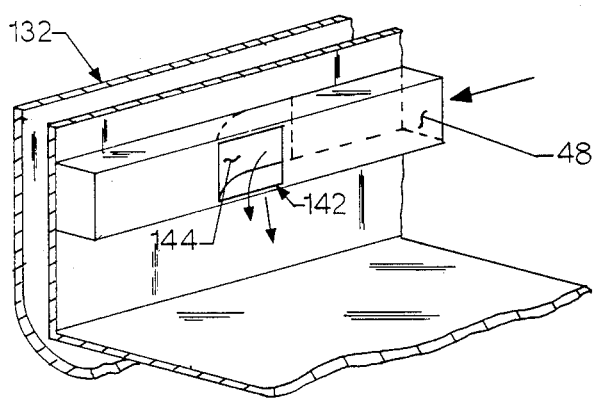
FIG. 8 is a perspective view of a portion of the left hand side wall of the cabin of the airplane of FIG. 1 showing how the heated air is returned to the cabin.

Assuming that the heater 32 has been turned on, the forced air coming from the cabin 20, through the heater 32 will then be returned to the cabin 20 via the elbow duct 42 shown in FIG. 7. The elbow duct 42 directs the air to a plenum 48 located on the side wall of the cabin itself. This plenum 48 is best shown in FIG. 8. In order to reduce the heat loss caused by providing the hottest air near the outer wall 132 of the airplane, a large opening 142 is provided in the plenum 48 to permit the air to be quickly be returned to the cabin 20. It can be seen that a curved piece of sheet metal 144 is provided to encourage the air to flow outwardly through the opening in the plenum. Although not shown in FIG. 8 the opening of the plenum may be covered with any suitable, aesthetically pleasing covering or screening which permits the air to freely escape into the mid-portion of the cabin.

Figure 9:
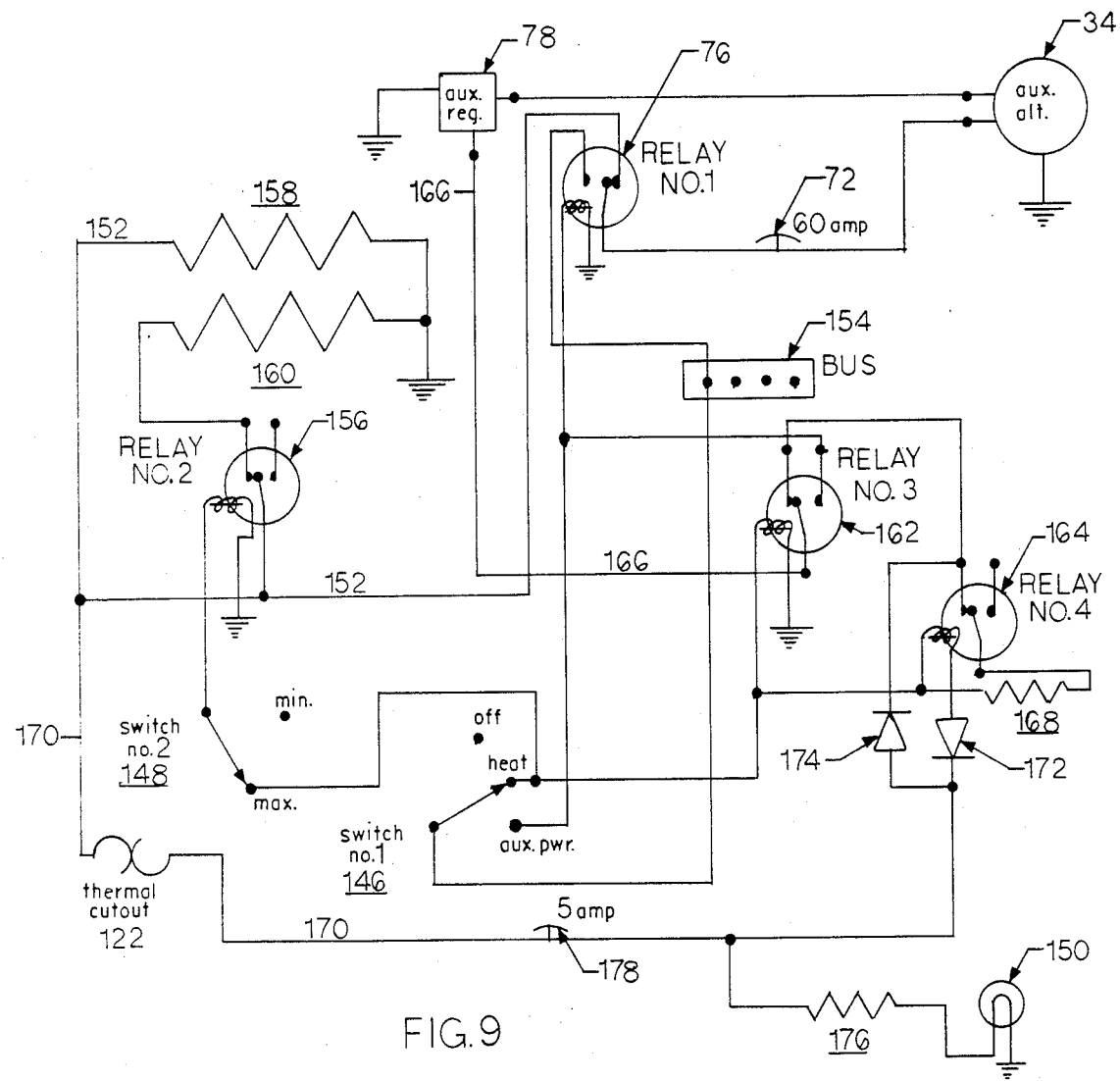
FIG. 9 is a circuit diagram for the heating system of the airplane shown in FIG. 1.

Turning now to FIG. 9 the control circuit for the heater unit 32 will be described in detail. Power is provided for the circuit by an alternator which is governed by a regulator. The control switches for the heater which are available to the pilot are shown as they appear on the pilot's control panel in FIG. 6. A first switch 146 is provided which has six switch settings. For our purposes we are interested only in the three switch settings "off", "heat" and "aux. pwr." This switch corresponds to the first switch 146 in the circuit diagram of FIG. 9. The next switch on the control panel of interest is the toggle switch 148 that has in its upper position the label "MAX" and in its lower position the label "MIN". This switch corresponds to the second switch 148 in the circuit diagram of FIG. 9. Finally of interest on the control panel is a light 150 which is labelled "htr" for "heater." This light corresponds to the light 150 in the lower right-hand side of the circuit diagram in FIG. 9.

The power from the alternator 34 is provided through a first relay 76 which can be referred to as the auxiliary power supply relay. In normal operation the first relay 76 is in the position shown. However when it is desired to "kick-in" the auxiliary power, the first switch 146 is switched to its "aux.pwr." setting. This activates the auxiliary power relay 76 which switches the alternator power into the airplane bus 154 itself.

In normal operation, however, the auxiliary power relay 76 remains in the position shown in the FIG. 9 circuit diagram. Power from the alternator 34 is directed along a heavy gauge wire 152 through to the heater coils 100. It will be recalled that advantageously the alternator is capable of providing 60 amps of current at 28 VDC. Under such circumstances, the wire used to carry this power to the heater is advantageously at least as large as 8 AWG (American Wire Gauge).

The heater coils 100 are shown schematically here as resistors 158, 160. Each set of four parallelly wired heater coils 100 is depicted in the circuit diagram as a single resistor 158, 160. Thus, resistor 158 corresponds to the upper rack 86 of four coils 100 and the resistor 160 corresponds to the lower rack 88 of four coils 100. When the second switch 148 is set to its maximum setting the second relay 156 is activated so that power runs through both sets of four heater coils 158, 160. It can be seen that when the second switch 148 is returned to its "minimum" setting the second relay will be deactivated and the second set of four heater coils 160 will be deactivated. This allows for a reduced heating level when the full power of the heater is not required to adequately warm up the cabin.

The third and fourth relays 162, 164 provide for control of the alternator 34, and thus the heater 32, by determining what voltage the regulator 78 sees on the regulator's control line 166. Thus when the first switch 146 is in its "off" position the third relay 162 is deactivated and a low or zero voltage appears on the control line 166 for the regulator. This deactivates the alternator 34 so that no power is generated.

When the first switch 146 is moved to the "heat" setting the third relay 162 is activated and is in the position shown in the circuit diagram of FIG. 9. This is because of the connection to the aircraft bus 154 through the switch 146. This setting also activates the fourth relay 164 which connects the power on the airplane bus to the regulator. The voltage is dropped down a bit by a resistor 168 to be sure that the regulator 78 sees a low enough voltage to activate the alternator 34. As soon as the alternator 34 is activated, power is provided by the alternator 34 to the heater coils 158, 160. This raises the voltage on the thermal cutout line 170 and in turn the other side of the first diode 172 resulting in the deactivation of the fourth relay 164. The second diode 174 bridges the fourth relay and permits the regulator 78 to monitor the voltage on the heater line 152 through the thermal cutout line. By this feedback, the regulator 7 will permit the alternator 34 to supply power to the heater coils 158, 160 provided that the voltage does not exceed a preset limit. A discussed above, this limit may advantageously be 28 VDC in order to be compatible with the electric systems of most aircraft of this type.

When the thermal cut out switch 122 breaks the circuit, the voltage on the regulator control line 166 is reduced to zero. The resistor 176 locted between the light 150 and the fourth relay 164 is selected to have a high enough resistance such that it prevents the fourth relay 164 from reactivating itself based on voltage obtained from the airplane bus. As a result the power to the heater coils 158, 160 is cut off. It can be seen that even though the thermal cutout line 170 results in turning off the heater, the heater light remains "on" indicating that the first switch 146 is still in the "heat" position. The threshold temperature at the thermal cutout switch 122 could, for example be set like a thermostat to provide a desired temperature in the cabin 20. As discussed above, however, a major reason for the thermal cutout switch 122 is to increase the life of the heater by keeping the temperature of the Nichrome wires within a range which reduces deterioration and thus increases the life of the wires.

In order to protect the circuit a 60 amp fuse 72 is connected in line with the alternator and a 5 amp fuse 178 is connected in line with the control circuitry. The wiring for the control circuitry may advantageously be about 18 gauge (AWG) wire while the wiring for the power portion of the circuit may advantageously be about 8 gauge (AWG) wire.

What is claimed is:

1. A method of replacing a combustion heater commonly found in twin engine propeller, fixed wing aircraft with an electrical resistance heater, said aircraft having a cabin, a nose duct for accepting outside air, bulkhead, a combustion heater and a duct system for directing outside air through said combustion heater to warm the interior of said cabin, said method comprising:

removing the combustion heater from said aircraft;

installing an electrical resistance air heater unit in place of the combustion heater for warming said cabin air to a comfortable level;

connecting said duct system to said air heater unit;

installing a fan for circulating air through the air heater and duct system;

modifying the duct system in said aircraft so as to continuously recirculate cabin air through said resistance heater while allowing only sufficient outside air into the cabin to maintain a sufficient oxygen level for the occupants of the cabin; and installing an auxiliary electrical power generator in addition to said power generating unit already on board said aircraft by mounting said power generator to an engine of said aircraft and connecting said power generator to said electrical resistance air heater unit, said generator being designed to provide sufficient power to said heater to warm said recirculating cabin air to a comfortable level.

2. In an aircraft having a cabin, a nose duct and an engine, the improvement comprising:

an electrical cabin air heater system including an electrical resistance air heater unit for warming air in said cabin to a comfortable level;

air ducts leasing from said cabin to said heater unit and back to said cabin;

a fan associated with said air ducts and air heater unit for recirculating air from the cabin through the air ducts and air heater unit and back into the cabin;

said air ducts being connected to said nose duct and being arranged to permit sufficient outside air to enter the cabin through said nose duct in order to maintain the oxygen level necessary for the comfort of the passengers while limiting the amount of outside air permitted to enter the cabin to an amount which will permit the resistance air heater unit to maintain the temperature of the cabin at a comfortable level; and a power generator, mounted to the engine of said aircraft, said generator being connected to said air heater unit and sized to provide sufficient power to said heater unit so as to allow the cabin to be warmed to a comfortable level, without significantly affecting the performance of said aircraft.

3. An aircraft as defined by claim 2, wherein the power output which must be supplied by said generator is calculated by the following formula:

$$QR/A = \Delta T$$

where:

$Q$ = the number of watts of the electric heater $\times 3.42$ (to get BTU/hr);

$R$ = thermal resistance factor (1/BTU/hr/feet—degrees F);

$A$ = surface area of the cabin interior (feet squared); and $\Delta T$ = change in temperature.

4. An aircraft as defined by claim 2, wherein said power generator generates electrical power compatible with the electrical system of the aircraft, additionally comprising means for permitting said generator to be used as an auxiliary power source for the aircraft in the event of a main power source failure.

5. An aircraft as defined by claim 2, wherein said cabin air heater system includes first and second pluralities of resistance heater coils and a switch for switching said second plurality of resistance heater coils on and off independently of said first plurality of heater coils so as to provide the heater system with a "HIGH" and "LOW" setting.

* * * * *